(12) United States Patent
Ransom

(10) Patent No.: US 7,360,664 B1
(45) Date of Patent: Apr. 22, 2008

(54) COLLAPSIBLE LUGGAGE AREA PROTECTOR

(76) Inventor: Robert M. Ransom, 8102 Coldwater Rd., Flushing, MI (US) 48433

( * ) Notice: Subject to any disclaimer, the term of this patent is extended or adjusted under 35 U.S.C. 154(b) by 52 days.

(21) Appl. No.: 10/687,341

(22) Filed: Oct. 17, 2003

(51) Int. Cl.
*B65D 30/10* (2006.01)
*B65D 33/02* (2006.01)

(52) U.S. Cl. .................................................. 220/9.2

(58) Field of Classification Search ............. 220/9.1, 220/9.2, 9.4, 6, 9.3, 904, 666, 573; 224/539, 224/542, 572, 42.34, 901.8, 403, 404; 296/39.1, 296/39.2; 383/33, 104
See application file for complete search history.

(56) References Cited

U.S. PATENT DOCUMENTS

| | | | |
|---|---|---|---|
| 3,653,710 A | 4/1972 | Barnard | |
| 3,997,507 A * | 12/1976 | Kirimoto et al. | 526/287 |
| 5,083,831 A | 1/1992 | Foyen | |
| 5,215,205 A * | 6/1993 | Behlman | 220/4.31 |
| 5,366,124 A * | 11/1994 | Dearborn, IV | 224/542 |
| 5,429,437 A * | 7/1995 | Shaw et al. | 383/33 |
| 5,722,710 A | 3/1998 | Falciani | |
| 5,800,067 A * | 9/1998 | Easter | 383/104 |
| 5,810,194 A * | 9/1998 | Samsel | 220/574 |
| 6,015,071 A * | 1/2000 | Adomeit et al. | 224/42.34 |
| 6,017,074 A | 1/2000 | Biskup | |
| 6,019,244 A * | 2/2000 | Jones | 220/666 |
| 6,105,842 A * | 8/2000 | Cesare | 224/404 |
| 6,167,898 B1 * | 1/2001 | Larga et al. | 135/137 |
| 6,254,162 B1 * | 7/2001 | Faber et al. | 296/39.2 |
| 6,360,761 B1 * | 3/2002 | Zheng | 135/126 |
| 6,783,016 B2 * | 8/2004 | Wang | 220/9.2 |
| 6,905,162 B2 * | 6/2005 | Lester et al. | 296/100.18 |
| 2003/0183629 A1 * | 10/2003 | Wang | 220/9.2 |

* cited by examiner

*Primary Examiner*—Anthony D. Stashick
*Assistant Examiner*—Harry A Grosso
(74) *Attorney, Agent, or Firm*—Young Basile

(57) ABSTRACT

The invention is a protective liner for the floor or cargo space of a motor vehicle. The protective liner is constructed of a flexible fabric, impervious to moisture and contaminants, which is provided with a flexible and coilable steel frame about its perimeter. The steel frame urges the cargo liner into unfolded and extended position when in use, but permits the liner to be collapsed into a compact package for storage and transport.

15 Claims, 3 Drawing Sheets

COLLAPSIBLE LUGGAGE AREA PROTECTOR

FIELD OF THE INVENTION

The invention pertains to cargo liners for vehicles, and more particularly, to the cargo liners incorporating a collapsible perimeter frame for providing shape to the cargo liner in use, while permitting the liner to be collapsed into a conveniently small package for storage.

BACKGROUND OF THE INVENTION

Almost all motor vehicles manufactured to date feature some type of storage compartment separable or separate from the passenger compartment in which a wide variety of cargo may be carried. In fact, the cargo-carrying capability of modern sport utility vehicles has, in part, accounted for their enormous popularity. Still, station wagon cargo areas and the trunk space of traditional four-door sedans all provide common utility and common problems for the vehicle owner.

One of the principal concerns of motor vehicle operators is the protection of the cargo area from damage caused by liquids or other materials such as mud, dirt, grease and grime which are often associated with the cargo being transported by the vehicle.

Certain prior art devices have been developed for protecting the cargo areas of vehicles from such damage and soil. Currently popular for such applications are flexible plastic or rubber tray-like devices which feature a floor and a perimeter wall. These devices may be placed in the cargo area, and may be designed to conform, in perimeter shape, to the shape of the cargo area. By constructing these cargo liners from durable material, such as rubber or thermoplastic, dirt and spills from cargo may be easily contained, and the light weight and flexible nature of the cargo liners themselves permits them to be easily removed from and reinstalled in the vehicle, as needed.

It has long been recognized, however, that it is desirable to create such cargo liner which is easily foldable or stowable. One solution to this problem is found in U.S. Pat. No. 5,083,831, issued to Foyen, which teaches a window shade-like retraction mechanism for a rollable and flexible cargo liner, which may be affixed to the rear seat of a motor vehicle. Another proposed solution is found in U.S. Pat. No. 6,017,074, issued to Biskup, which teaches a foldable cargo liner. A cargo liner which has upstanding walls capable of providing lateral protection to the interior walls of a motor vehicle is taught by Falciani in U.S. Pat. No. 5,722,710. An interesting effort is depicted in U.S. Pat. No. 3,653,710, issued to Barnard, which features inflatable elements to offer support structure to the cargo liner when in use, yet allow the device to be collapsed when not in use by deflation of the inflatable elements.

Each of these prior art devices are limited by their complexity, bulk, weight, collapsed size and the time required to stow and unstow, making them unsuitable in many applications.

SUMMARY OF THE INVENTION

Accordingly, it is an object of the present invention to provide a new and improved cargo liner for motor vehicles which is lightweight, readily collapsible, easily installed and removed from the motor vehicle, while still protecting the carpeting or other surfaces of the cargo area within the motor vehicle.

Another object of the present invention is to provide a new and improved cargo liner for a motor vehicle which is collapsible into a size substantially smaller than the surface area presented by the cargo area of the motor vehicle itself.

A further object of the present invention is to provide a new and improved cargo liner for motor vehicles which utilizes a collapsible perimeter frame adapted to the shape of the cargo area in which the cargo liner is installed.

A further object of the present invention is to provide an improved cargo liner for motor vehicles which is constructed of a lightweight and inexpensive material which provides a flexibility at the same time that it provides impermeability to potentially stain-causing contaminants associated with the cargo to be carried in the motor vehicle.

In summary, the present invention comprises a flexible and impermeable barrier of material which may be either fabric, thermoplastic or rubber. The material is configured so that when extended in a flat sheet, the perimeter of the material matches in shape and dimension the approximate perimeter of the cargo area in which the cargo liner is placed.

The perimeter of the cargo liner of the invention is provided with a sleeve, in which is installed a coilable steel framework having a high degree of flexibility and resiliency. The framework is configured so as to be coilable, permitting the cargo liner to be collapsed into a small package easily stowed in the vehicle or removed from the vehicle for storage, without taking up an undue amount of storage space.

These and other features of the invention are described below in further detail, with reference to the drawings.

DESCRIPTION OF THE PREFERRED EMBODIMENT

Figure 1:
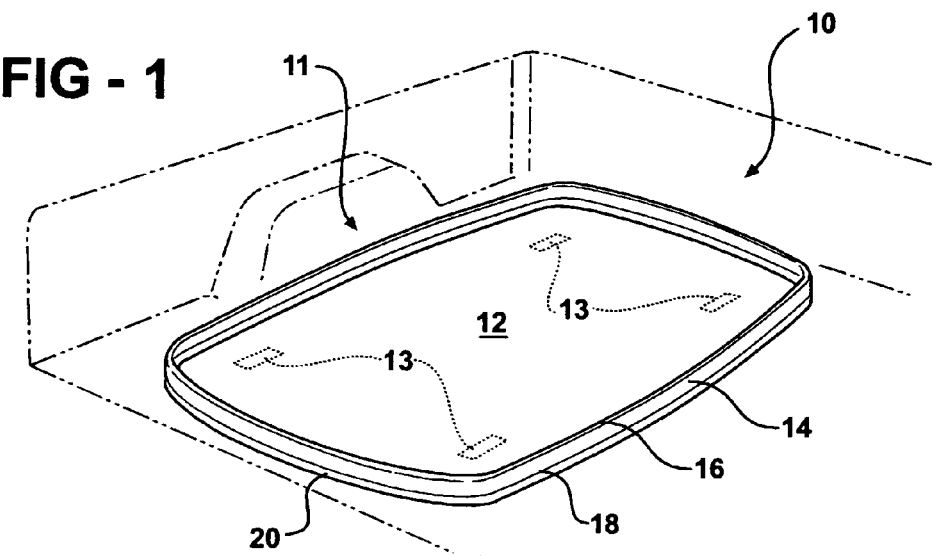
FIG. 1 is a perspective view of the invention as installed in a typical motor vehicle environment.

The cargo liner 10 as shown in FIG. 1, is preferably the size selected to fit the cargo area of a motor vehicle. This cargo area may be the bed of an open or enclosed truck or sport utility vehicle, the floor of the trunk of a conventional sedan, and in smaller sizes, the floor area of either the front or rear passenger compartment of a motor vehicle. A wide variety of sizes of cargo liners 10 may be manufactured, likewise having a wide variety of shapes corresponding to the shape of the area to be protected. In addition, the perimeter 11 of cargo liner 10 may be contoured so that the overall planform of cargo liner 10 corresponds to the planform of the cargo area in which the cargo liner 10 is placed.

Cargo liner 10 comprises a floor 12 and a continuous wall 14 which surrounds the perimeter of floor 12. Wall 14 has an upper edge 16 and a lower edge 18 which is affixed, by stitching or other well known means to a sleeve 20 which is likewise continuous and surrounds the perimeter of floor 12. Preferably, floor 12, wall 14, and sleeve 20 are manufactured from a flexible material having the characteristics of high durability and low permeability, so that dirt or other solid or liquid contaminants will not permeate the fabric floor 12 or wall 14. In this fashion, the shallow containment vessel created by floor 12 and wall 14 serves to contain solid or liquid contaminants placed within the perimeter 11. The fabric of floor 12 and wall 14 may be treated in any of a number of well known means to render the fabric impermeable to moisture and effectively repellent to permanent staining. At the same time, the fabric of floor 12, wall 14 and sleeve 20 is preferably of a lightweight and highly flexible material such as Dacron, nylon or thermoplastic sheeting, enabling the cargo liner 10 to be easily carried and stored in both its unfolded and folded configurations.

Figure 2:
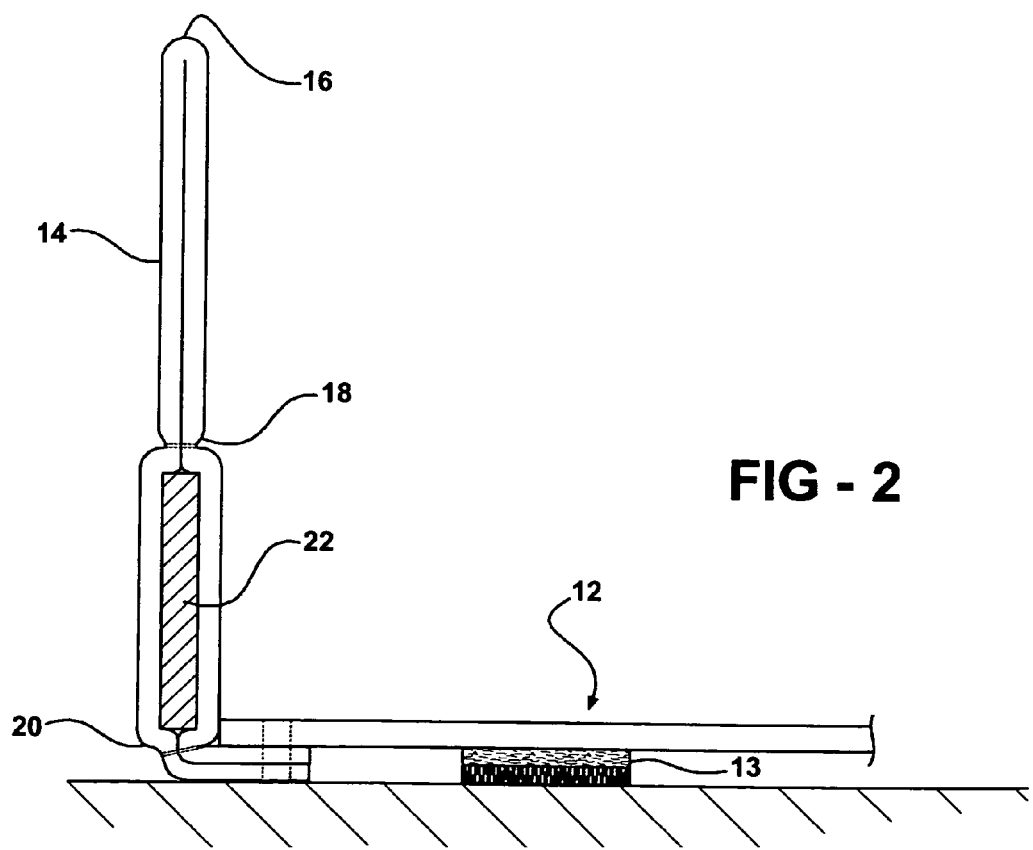
FIG. 2 is a detailed, cutaway view of a portion of the perimeter of the invention, showing the interrelationship between the liner material, the sleeve in the liner material and the frame.

FIG. 2 is a cutaway view of a section of the cargo liner showing a section of the floor 12, a section of the wall 14, and of the sleeve 20. Captured within sleeve 20 is a flexible and coilable resilient frame 22, preferably manufactured as a relatively thin strip of metal material, such as spring steel. Frame 22 when uncoiled is of an identical size to the maximum outer dimension of cargo liner 10 in its unfolded configuration as shown in FIG. 1. By utilizing a spring steel frame 22 captured within sleeve 20 and surrounding floor 12, it will be seen that when the cargo liner 10 is in its unfolded configuration, frame 22 will urge the outer perimeter 11 of cargo liner 10 to its full and unfolded configuration, placing a predetermined amount of tension on the sleeve 20, which in turn, places tension on floor 12, rendering the cargo liner relatively flat while still flexible. Preferably, sleeve 20 is sewn or otherwise attached to floor 12, and the lower edge 18 of wall 14 is secured by stitching or comparable methodologies to the upper edge of sleeve 20. Preferably, the material for wall 14 is of sufficient resilience to permit the wall to be readily folded as further described herein, but at the same time wall 14 is of sufficient stiffness as to permit wall 14 to remain substantially upright when the cargo liner 10 is in its unfolded configuration as shown in FIG. 1.

Figure 3A:
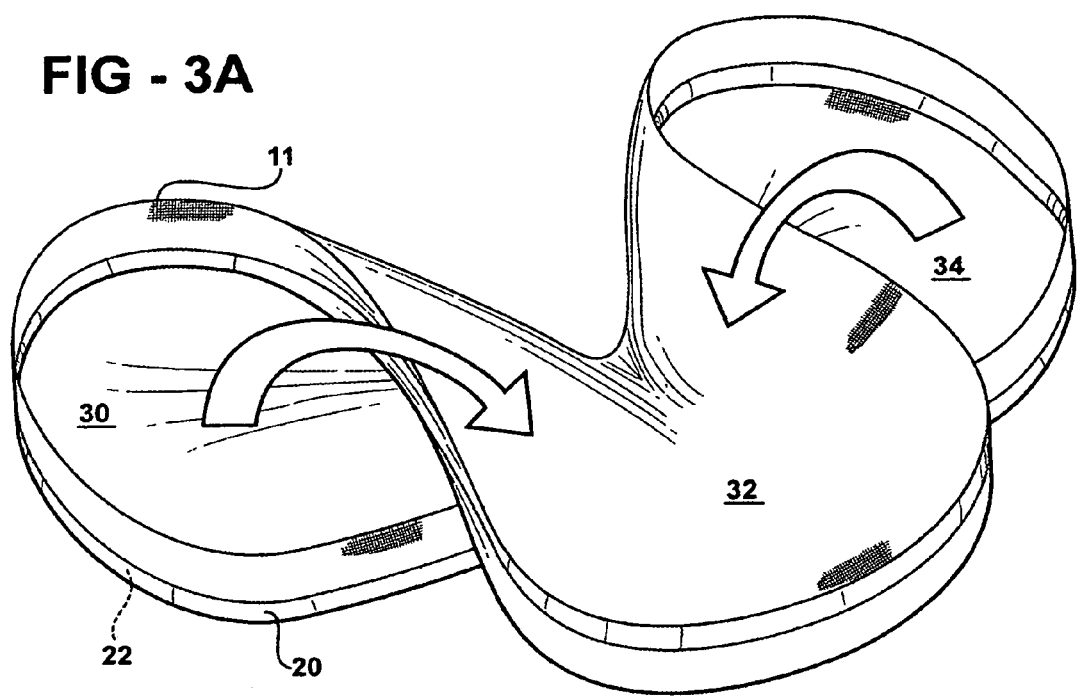
FIGS. 3A-3C is a series of drawings depicting the process of folding the invention.
Figure 3B:
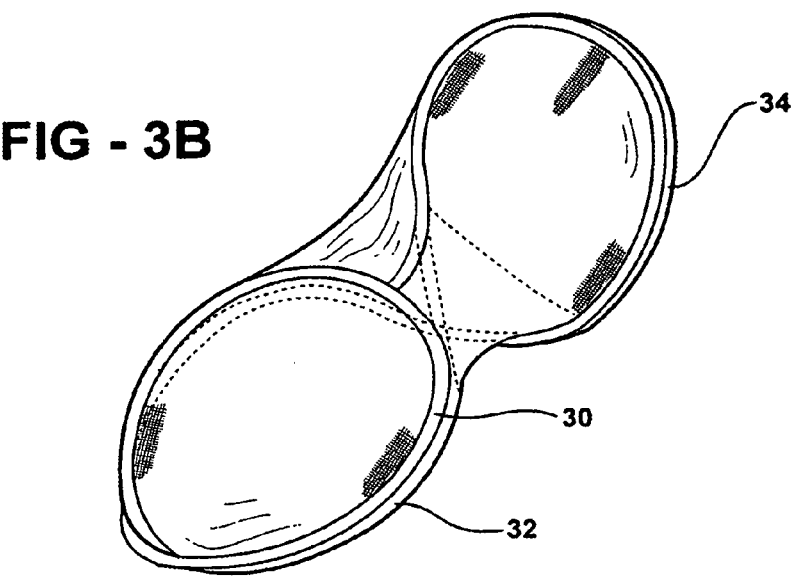
Figure 3C:
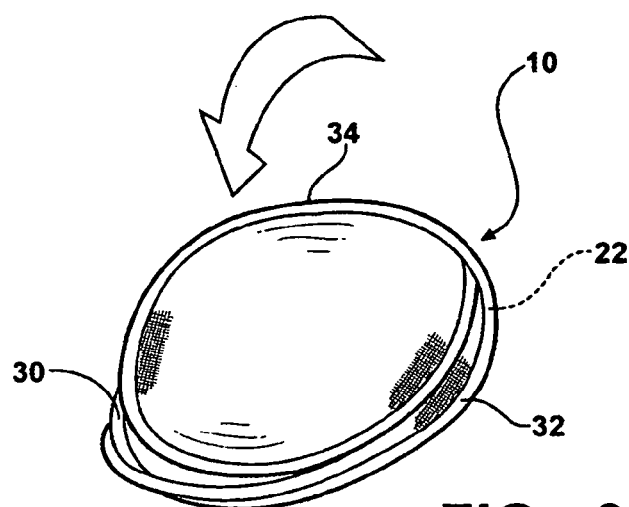

To permit cargo liner 10 to be readily folded into a compact package for storage and transportation, the frame 22 may be easily reconfigured as a folded frame as shown in FIG. 3A. To fold the cargo liner 10, any portion of any side of the perimeter 11 is grasped and folded over the remaining walls of the cargo liner. This first step creates three loops of the frame 22 and sleeve 20, as shown in FIG. 3A, the loops being designated as 30, 32 and 34. Loop 34 is then twisted 180° to overlay loop 32. This step urges loop 30 to overlie loops 32 and 34 as shown in FIGS. 3B and 3C. Once the folding process has been completed as shown in FIG. 3C, the folded cargo liner consists of three interconnected loops of frame 22 and fabric. The folded cargo liner occupies space having a diameter only one-third that of the unfolded diameter of the cargo liner 10, and having an overall thickness only slightly thicker than the unfolded configuration of the cargo liner 10. Because of the flexibility of the floor 12, wall 14 and sleeve 20, the folded configuration of the cargo liner as shown in FIG. 3C is readily portable and easily stored either inside or outside the vehicle in which the cargo liner is used.

Figure 4:
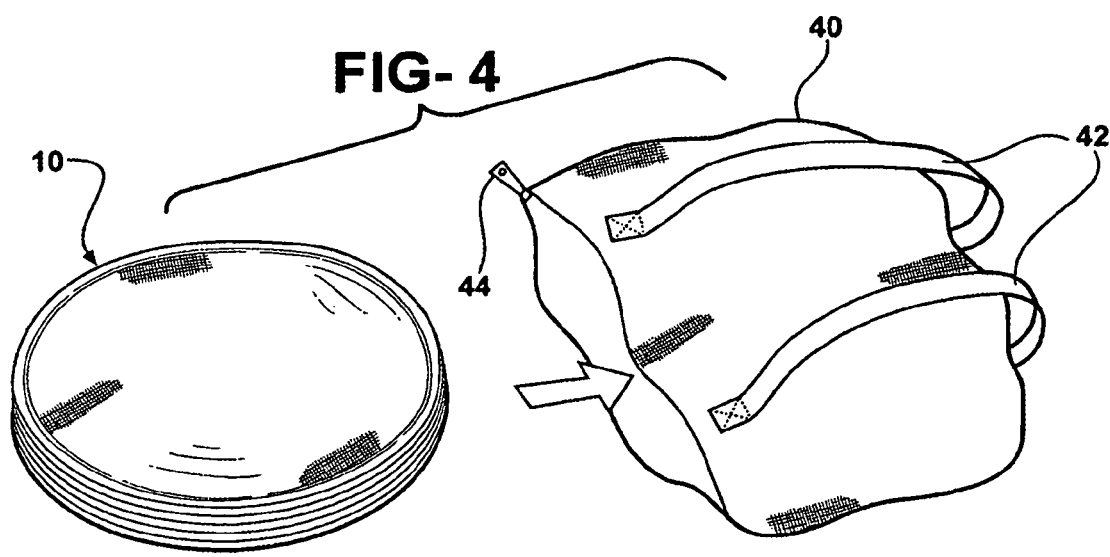
FIG. 4 is a perspective view of the invention stored in its storage container.

Because the spring steel frame 22, in its coiled configuration as shown in FIG. 3C has a tendency, when not restrained, to return to the unfolded configuration shown in FIG. 1, it is desirable to secure the three coils 30, 32 and 34 together. This may be done by simply tying the folded cargo liner with suitable securing ties, or by storing the folded liner in a container 40, such as shown in FIG. 4. FIG. 4 depicts the folded cargo liner 10 ready to be placed in container 40. Container 40 is typically in the form of a flexible flat bag-like container, such as a knapsack. Preferably, container 40 is provided with a closure 44, such as a zipper, and one or more carrying straps 42. Placement of the folded cargo liner 10 into the container 40, followed by closure of the closure 44 serves to restrain the cargo liner 10 from unfolding. Container 40 provides protection to the folded cargo liner 10, in addition to rendering it easily transportable.

In one embodiment, to prevent the cargo liner 10 from moving in relation to the area of the vehicle in which cargo liner 10 is installed, the floor 12 of cargo liner 10 is provided with fasteners 13, adapted to engage the upper surface of the area in which the cargo liner 10 is placed. In one embodiment, fasteners 13 are in the form of the "hook" material commonly used as part of a "hook and loop" fastener, such as Velcro™. The use of the "hook" portion of the Velcro™ fastener is advantageous inasmuch as this portion of the hook and loop fastener is well adapted to removably engage the surface of motor vehicle carpeting, commonly found in cargo areas, passenger areas and trunks of motor vehicles. Other fasteners such as snaps may be used, but are less desirable in that they require corresponding placement in the cargo area and on the cargo liner 10 of complimentary mating portions of such fasteners, correctly positioned for engagement when the cargo liner is in use.

It will be apparent from this description, to those skilled in the art, that numerous minor alterations and modifications to the invention may be made without departing from the scope of the invention herein described, which I claim as follows:

1. A protective liner for a vehicle storage area of predetermined shape and size comprising:
   a flexible and substantially impermeable floor having a perimeter and substantially forming a plane;
   a flexible and substantially impermeable sleeve surrounding and affixed to said perimeter of said floor;
   a flexible and substantially impermeable wall affixed to said sleeve and having a free end opposite said sleeve, wherein the wall is normal to the plane formed by the floor; the liner having a collapsed orientation and an uncollapsed orientation, wherein said wall is sufficiently resilient to allow said wall to be folded into said collapsed orientation and of sufficient stiffness to permit said wall to remain substantially upright in said uncollapsed orientation; and
   a flexible and coilable resilient frame captured within said sleeve.

2. The invention of claim 1, having a perimeter shape and size, wherein said perimeter shape and size are substantially the same as said shape and said size of said vehicle storage area.

3. A protective liner for a vehicle storage area of predetermined shape and size comprising:
   a flexible and substantially impermeable floor having a perimeter;
   a flexible and substantially impermeable sleeve surrounding and affixed to said perimeter of said floor;
   a flexible, upright, and substantially impermeable wall affixed to said sleeve and having a free end opposite said sleeve; the liner having a collapsed orientation and an uncollapsed orientation, wherein said wall is sufficiently resilient to allow said wall to be folded into said collapsed orientation and of sufficient stiffness to permit said wall to remain substantially upright in said uncollapsed orientation;
   a flexible and coilable resilient frame captured within said sleeve; and said liner further comprising a fastener means, whereby said liner is removably secured to said vehicle storage area.

4. The invention of claim 3, having a perimeter shape and size, wherein said perimeter shape and size are substantially the same as said shape and said size of said vehicle storage area.

5. A protective liner for a supporting surface of a vehicle storage area, comprising:
- a substantially planar floor supported by the supporting surface and in substantially continuous contact therewith, wherein said substantially planar floor is flexible and substantially impermeable;
- a sleeve extending substantially upright with respect to said substantially planar floor and said sleeve surrounding and affixed to said perimeter of said substantially planar floor, wherein said sleeve is flexible and substantially impermeable;
- a wall having a bottom edge affixed to said sleeve and a free top edge opposite said bottom edge, and said wall extending substantially normal to said substantially planar floor, wherein said wall is flexible and substantially impermeable; wherein the liner has a collapsed orientation and an uncollapsed orientation, wherein said wall is sufficiently resilient to allow said wall to be folded into said collapsed orientation and of sufficient stiffness to permit said wall to remain substantially upright in said uncollapsed orientation; and
- a flexible and coilable resilient frame captured within said sleeve for applying tension to said sleeve and said floor wherein said sleeve is affixed to said perimeter of said substantially planar floor adjacent to a bottom edge of said frame and said sleeve is affixed to said bottom edge of said wall adjacent to a top edge of said frame.

6. The invention of claim 5, wherein said substantially planar floor defines an upwardly-facing surface that is exposed to the vehicle storage area.

7. The invention of claim 1, wherein said wall and said frame are aligned vertically.

8. The invention of claim 1, wherein said wall and said frame are substantially coplanar.

9. The invention of claim 1, wherein said free end of said wall substantially overlies said frame.

10. The invention of claim 3, wherein said wall and said frame are aligned vertically.

11. The invention of claim 3, wherein said wall and said frame are substantially coplanar.

12. The invention of claim 3, wherein said free end of said wall substantially overlies said frame.

13. The invention of claim 5, wherein said wall and said frame are aligned vertically.

14. The invention of claim 5, wherein said wall and said frame are substantially coplanar.

15. The invention of claim 5, wherein said free top edge of said wall substantially overlies said frame.

* * * * *